(12) United States Patent
Hesch et al.

(10) Patent No.: US 9,445,015 B2
(45) Date of Patent: Sep. 13, 2016

(54) METHODS AND SYSTEMS FOR ADJUSTING SENSOR VIEWPOINT TO A VIRTUAL VIEWPOINT

(71) Applicant: Google Inc., Mountain View, CA (US)

(72) Inventors: Joel Hesch, Sunnyvale, CA (US); Ryan Hickman, Mountain View, CA (US); Johnny Lee, Sunnyvale, CA (US)

(73) Assignee: GOOGLE INC., Mountain View, CA (US)

( * ) Notice: Subject to any disclaimer, the term of this patent is extended or adjusted under 35 U.S.C. 154(b) by 0 days.

(21) Appl. No.: 14/185,477

(22) Filed: Feb. 20, 2014

(65) Prior Publication Data

US 2015/0237269 A1 Aug. 20, 2015

(51) Int. Cl.

| | |
|---|---|
| *H04N 5/262* | (2006.01) |
| *H04N 5/232* | (2006.01) |
| *H04N 5/225* | (2006.01) |
| *G06T 15/20* | (2011.01) |
| *H04W 4/02* | (2009.01) |

(52) U.S. Cl.
CPC ........... *H04N 5/2628* (2013.01); *G06T 15/205* (2013.01); *H04N 5/2258* (2013.01); *H04N 5/23229* (2013.01); *H04N 5/23293* (2013.01); *H04N 5/2621* (2013.01); *H04N 2209/047* (2013.01); *H04W 4/026* (2013.01); *H04W 4/027* (2013.01)

(58) Field of Classification Search
CPC . G06T 7/0022; G06T 7/0042; G06T 15/205; H04N 13/0011; H04N 13/0014; H04N 5/2628; H04N 5/2621; H04N 5/23293; H04N 5/23229; H04N 5/2258; H04N 2209/047; H04W 4/027; H04W 4/026
See application file for complete search history.

(56) References Cited

U.S. PATENT DOCUMENTS

| | | | | |
|---|---|---|---|---|
| 2007/0257915 A1* | 11/2007 | Kutaragi | ............... | G06F 3/011 345/427 |
| 2012/0177284 A1* | 7/2012 | Wang | ................. | G06T 7/0075 382/154 |
| 2014/0104307 A1* | 4/2014 | Tanaka | ................ | G06F 3/005 345/619 |

OTHER PUBLICATIONS

Johnny Lee, Head Tracking for Desktop VR Displays using the WiiRemote, YouTube, https://www.youtube.com/watch?v=Jd3-eiid-Uw.

* cited by examiner

*Primary Examiner* — Mekonnen Dagnew

(57) ABSTRACT

Example methods and systems for adjusting sensor viewpoint to a virtual viewpoint are provided. An example method may involve receiving data from a first camera; receiving data from a second camera; transforming, from the first viewpoint to a virtual viewpoint within the device, frames in a first plurality of frames based on an offset from the first camera to the virtual viewpoint; determining, in a second plurality of frames, one or more features and a movement, relative to the second viewpoint, of the one or more features; and transforming, from the second viewpoint to the virtual viewpoint, the movement of the one or more features based on an offset from the second camera to the virtual viewpoint; adjusting the transformed frames of the virtual viewpoint by an amount that is proportional to the transformed movement; and providing for display the adjusted and transformed frames of the first plurality of frames.

20 Claims, 10 Drawing Sheets

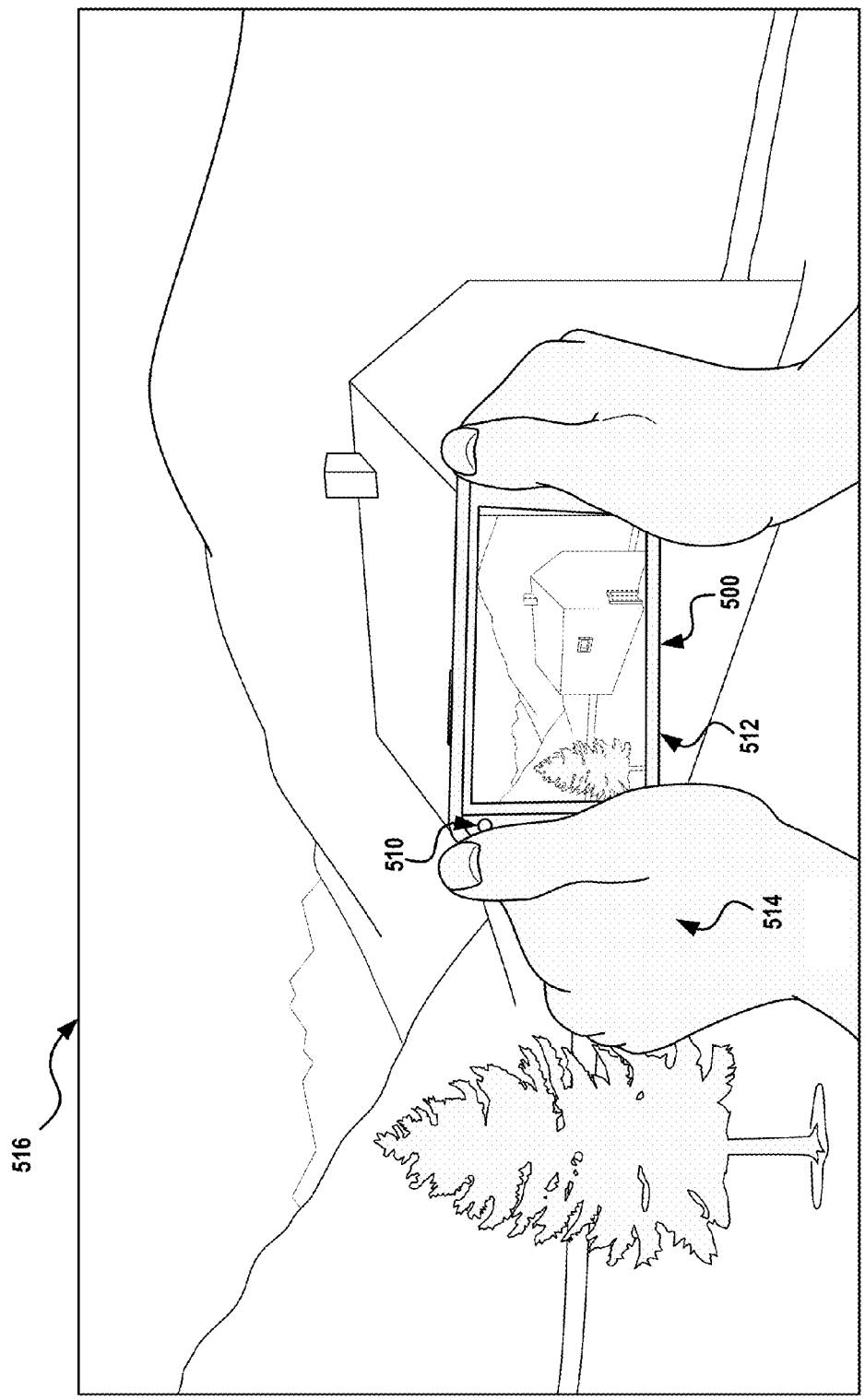

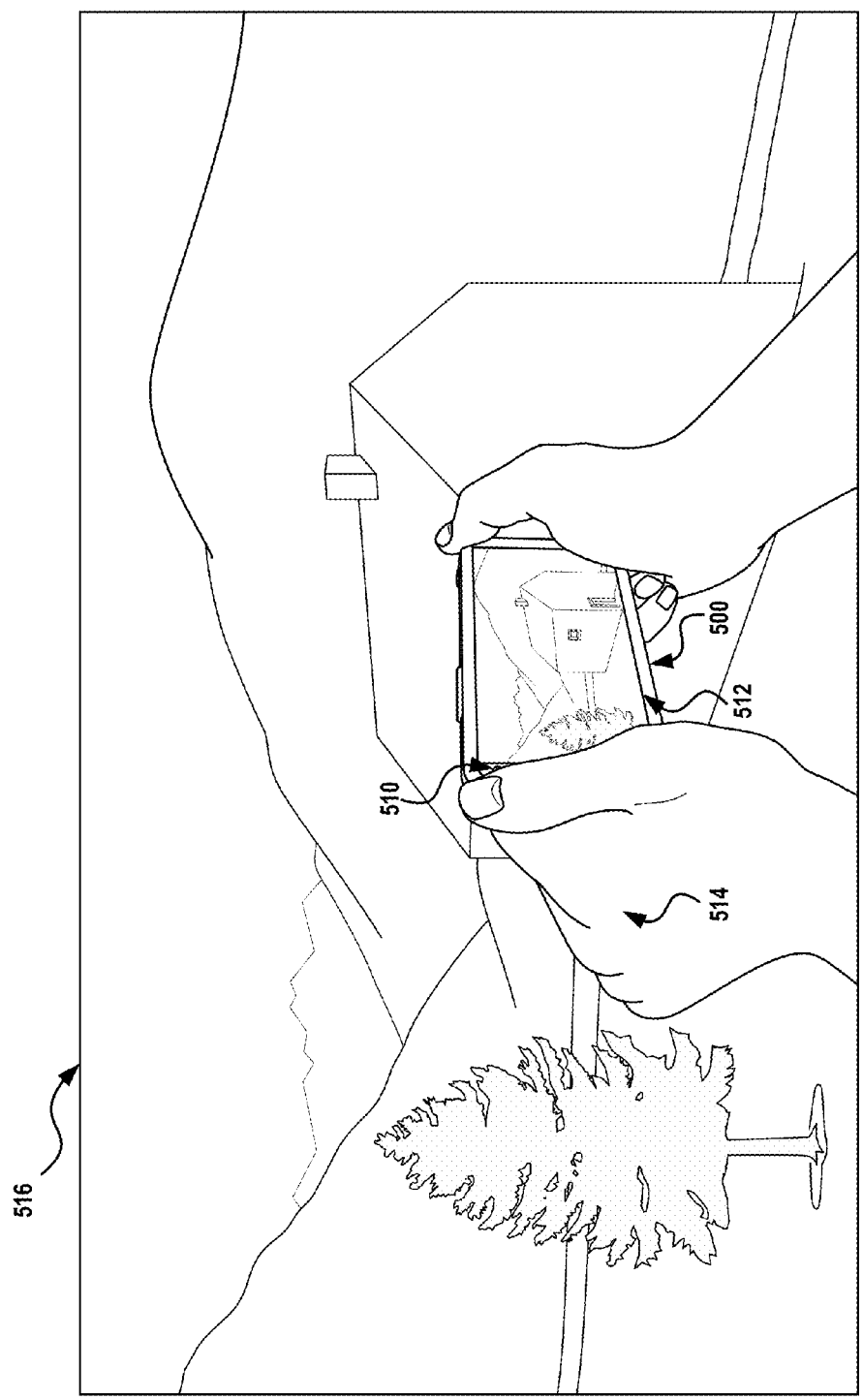

METHODS AND SYSTEMS FOR ADJUSTING SENSOR VIEWPOINT TO A VIRTUAL VIEWPOINT

BACKGROUND

Unless otherwise indicated herein, the materials described in this section are not prior art to the claims in this application and are not admitted to be prior art by inclusion in this section.

Sensor fusion includes combining sensor data or data derived from sensory data from independent sources such that resulting information is more complete. Data sources for a fusion process may include multiple distinct sensors. Each sensor may provide different information about the same object in an environment, or about the same location in an environment, for example. By combining the sensor data, a more complete depiction of the object or location can be provided. As an example, one sensor may include a camera to capture an image of an object, and another sensor may include location detection capabilities to determine a location of a device used to capture the image. By combining the sensor data, specific location information for the image data is provided.

SUMMARY

In one example, a method is provided. The method comprises receiving data from a first camera within a device, and the data comprises a first plurality of frames from a first viewpoint. The method also comprises receiving data from a second camera within the device, and the data comprises a second plurality of frames from a second viewpoint, and the second viewpoint is opposite the first viewpoint. The method also comprises transforming, from the first viewpoint to a virtual viewpoint within the device, frames in the first plurality of frames based on an offset from the first camera to the virtual viewpoint. The method also comprises determining, in the second plurality of frames, one or more features and a movement, relative to the second viewpoint, of the one or more features and transforming, from the second viewpoint to the virtual viewpoint, the movement, relative to the second viewpoint, of the one or more features based on an offset from the second camera to the virtual viewpoint. The method also comprises adjusting the transformed frames of the virtual viewpoint by an amount that is proportional to the transformed movement and providing for display the adjusted and transformed frames of the first plurality of frames at the virtual viewpoint.

In another example, a device is provided that comprises a first camera, a second camera, one or more processors, and data storage configured to store instructions, that when executed by the one or more processors, cause the device to perform functions. The functions comprise receive data from a first camera within the device, and the data comprises a first plurality of frames from a first viewpoint. The functions also comprise receive data from the second camera, and the data comprises a second plurality of frames from a second viewpoint, and the second viewpoint is different from the first viewpoint. The functions also comprise transform, from the first viewpoint to a virtual viewpoint within the device, frames in the first plurality of frames based on an offset from the first camera to the virtual viewpoint. The functions also comprise determine, in the second plurality of frames, one or more features and a movement, relative to the second viewpoint, of the one or more features and transform, from the second viewpoint to the virtual viewpoint, the movement, relative to the second viewpoint, of the one or more features based on an offset from the second camera to the virtual viewpoint. The functions also comprise adjust the transformed frames of the virtual viewpoint by an amount that is proportional to the transformed movement and provide for display the adjusted and transformed frames of the first plurality of frames at the virtual viewpoint.

In another example, a computer readable memory configured to store instructions that, when executed by a device having an application processor configured to function based on an operating system and a co-processor configured to receive data from a plurality of sensors of the device, cause the device to perform functions is provided. The functions comprise receiving data from a first camera within the device, and the data comprises a first plurality of frames from a first viewpoint. The functions also comprise receiving data from a second camera within the device, and the data comprises a second plurality of frames from a second viewpoint, and the second viewpoint is opposite the first viewpoint. The functions also comprise transforming, from the first viewpoint to a virtual viewpoint within the device, frames in the first plurality of frames based on an offset from the first camera to the virtual viewpoint. The functions also comprise comprises determining, in the second plurality of frames, one or more features and a movement, relative to the second viewpoint, of the one or more features and transforming, from the second viewpoint to the virtual viewpoint, the movement, relative to the second viewpoint, of the one or more features based on an offset from the second camera to the virtual viewpoint. The functions also comprise adjusting the transformed frames of the virtual viewpoint by an amount that is proportional to the transformed movement and providing for display the adjusted and transformed frames of the first plurality of frames at the virtual viewpoint.

These as well as other aspects, advantages, and alternatives, will become apparent to those of ordinary skill in the art by reading the following detailed description, with reference where appropriate to the accompanying figures.

BRIEF DESCRIPTION OF THE FIGURES

FIG. 5A is an illustration of an example device that may carry out one or more of the functions described herein operating in an example environment.

FIG. 5C is another illustration of the example device that may carry out one or more of the functions described herein operating in the example environment.

DETAILED DESCRIPTION

Figure 1:
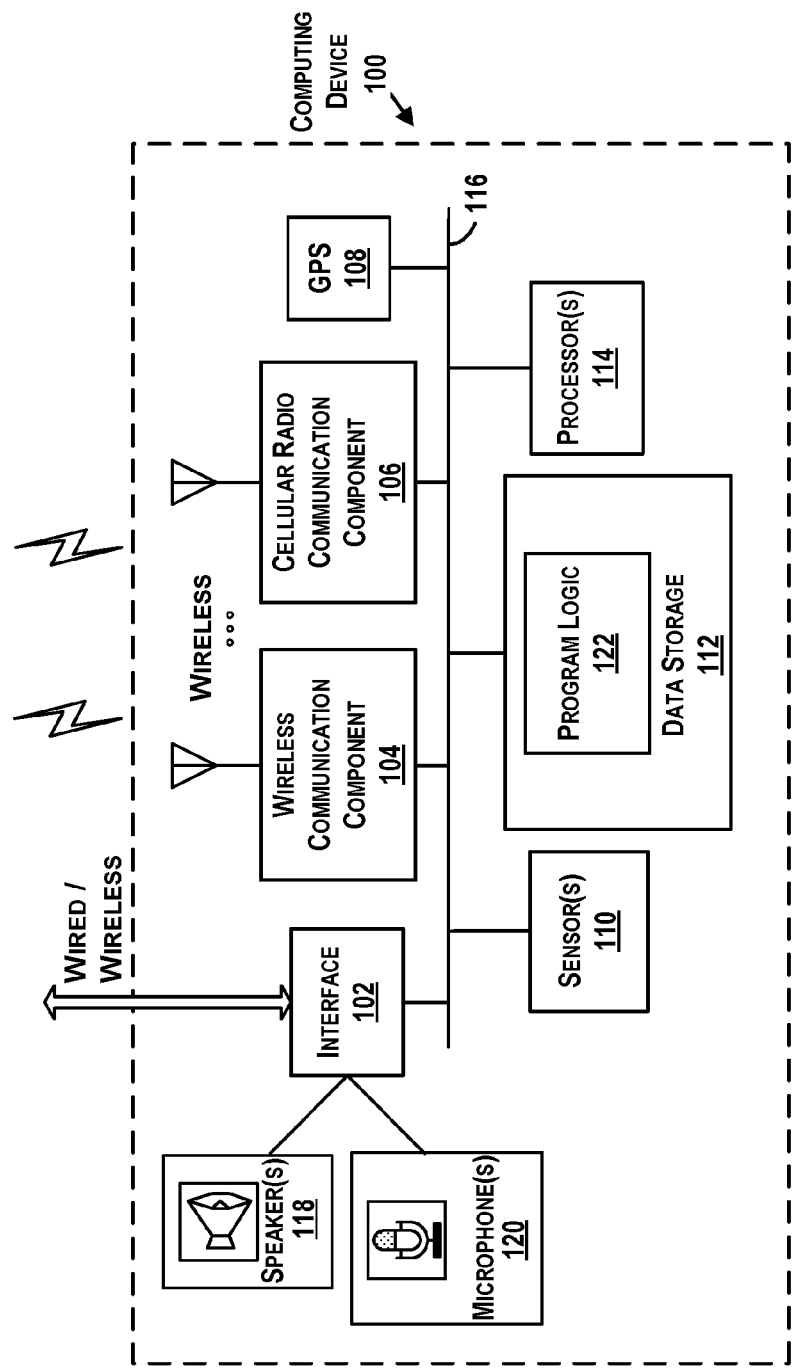
FIG. 1 illustrates an example computing device.

The following detailed description describes various features and functions of the disclosed systems and methods with reference to the accompanying figures. In the figures, similar symbols identify similar components, unless context dictates otherwise. The illustrative system and method embodiments described herein are not meant to be limiting. It may be readily understood that certain aspects of the disclosed systems and methods can be arranged and combined in a wide variety of different configurations, all of which are contemplated herein.

Within examples, methods and systems adjusting sensor viewpoints to a virtual viewpoint are described. Example methods may be performed by a device having a first camera, a second camera, one or more processors, and data storage configured to store instructions, that when executed by the one or more processors, cause the device to perform functions. An example method involves receiving data from a first camera within the device, and the data includes a first plurality of frames from a first viewpoint. The method also involves receiving data from a second camera within the device, and the data includes a second plurality of frames from a second viewpoint, and the second viewpoint is opposite the first viewpoint. The method also involves transforming, from the first viewpoint to a virtual viewpoint within the device, frames in the first plurality of frames based on an offset from the first camera to the virtual viewpoint. The method also involves determining, in the second plurality of frames, one or more features and a movement, relative to the second viewpoint, of the one or more features and transforming, from the second viewpoint to the virtual viewpoint, the movement, relative to the second viewpoint, of the one or more features based on an offset from the second camera to the virtual viewpoint. The method also involves adjusting the transformed frames of the virtual viewpoint by an amount that is proportional to the transformed movement and providing for display the adjusted and transformed frames of the first plurality of frames at the virtual viewpoint.

Augmented reality may involve providing a live view of a physical, real-world environment where the elements of the environment are augmented by sensor data such as audio, video, graphics, or GPS coordinates. Augmented reality may be implemented in a variety of devices, such as head-mounted displays, eyeglass displays, contact lenses, or handheld devices. Handheld devices, for example, may provide video see-through on a display. Video see-through may, in some circumstances, provide to a user an effect of looking through a window into the physical, real-world environment. However, in some existing devices, the effect of looking through the window into the physical, real-world environment may be lost when either the device or the user moves in relation to the other. Within examples presented herein, one or more processors may function to maintain the effect of looking through the window as the device or the user moves relative to the other. Such functionality may involve making proportional adjustments as to the device or the user's movements. Such functionality may also involve transforming sensor data from sensors located at various positions within the device to a virtual viewpoint that is ultimately provided on the display.

Referring now to the figures, FIG. 1 illustrates an example computing device 100. In some examples, components illustrated in FIG. 1 may be distributed across multiple computing devices. However, for the sake of example, the components are shown and described as part of one example computing device 100. The computing device 100 may be or include a mobile device (such as a mobile phone), desktop computer, laptop computer, email/messaging device, tablet computer, or similar device that may be configured to perform the functions described herein. Generally, the computing device 100 may be any type of computing device or transmitter that is configured to transmit data or receive data in accordance with methods and functions described herein.

The computing device 100 may include an interface 102, a wireless communication component 104, a cellular radio communication component 106, a global position system (GPS) receiver 108, sensor(s) 110, data storage 112, and processor(s) 114. Components illustrated in FIG. 1 may be linked together by a communication link 116. The computing device 100 may also include hardware to enable communication within the computing device 100 and between the computing device 100 and other computing devices (not shown), such as a server entity. The hardware may include transmitters, receivers, and antennas, for example.

The interface 102 may be configured to allow the computing device 100 to communicate with other computing devices (not shown), such as a server. Thus, the interface 102 may be configured to receive input data from one or more computing devices, and may also be configured to send output data to the one or more computing devices. The interface 102 may be configured to function according to a wired or wireless communication protocol. In some examples, the interface 102 may include buttons, a keyboard, a touchscreen, speaker(s) 118, microphone(s) 120, and/or any other elements for receiving inputs, as well as one or more displays, and/or any other elements for communicating outputs.

The wireless communication component 104 may be a communication interface that is configured to facilitate wireless data communication for the computing device 100 according to one or more wireless communication standards. For example, the wireless communication component 104 may include a Wi-Fi communication component that is configured to facilitate wireless data communication according to one or more IEEE 802.11 standards. As another example, the wireless communication component 104 may include a Bluetooth communication component that is configured to facilitate wireless data communication according to one or more Bluetooth standards. Other examples are also possible.

The cellular radio communication component 106 may be a communication interface that is configured to facilitate wireless communication (voice and/or data) with a cellular wireless base station to provide mobile connectivity to a network. The cellular radio communication component 106 may be configured to connect to a base station of a cell in which the computing device 100 is located, for example.

The GPS receiver 108 may be configured to estimate a location of the computing device 100 by precisely timing signals sent by GPS satellites.

The sensor(s) 110 may include one or more sensors, or may represent one or more sensors included within the computing device 100. Example sensors include an accelerometer, gyroscope, pedometer, light sensors, microphone, camera(s), infrared flash, barometer, magnetometer, GPS, WiFi, near field communication (NFC), Bluetooth, projector, depth sensor, temperature sensors, or other location and/or context-aware sensors.

The data storage 112 may store program logic 122 that can be accessed and executed by the processor(s) 114. The data storage 112 may also store data collected by the sensor(s) 110, or data collected by any of the wireless communication component 104, the cellular radio communication component 106, and the GPS receiver 108.

The processor(s) 114 may be configured to receive data collected by any of sensor(s) 110 and perform any number of functions based on the data. As an example, the processor(s) 114 may be configured to determine one or more geographical location estimates of the computing device 100 using one or more location-determination components, such as the wireless communication component 104, the cellular radio communication component 106, or the GPS receiver 108. The processor(s) 114 may use a location-determination algorithm to determine a location of the computing device 100 based on a presence and/or location of one or more known wireless access points within a wireless range of the computing device 100. In one example, the wireless location component 104 may determine the identity of one or more wireless access points (e.g., a MAC address) and measure an intensity of signals received (e.g., received signal strength indication) from each of the one or more wireless access points. The received signal strength indication (RSSI) from each unique wireless access point may be used to determine a distance from each wireless access point. The distances may then be compared to a database that stores information regarding where each unique wireless access point is located. Based on the distance from each wireless access point, and the known location of each of the wireless access points, a location estimate of the computing device 100 may be determined.

In another instance, the processor(s) 114 may use a location-determination algorithm to determine a location of the computing device 100 based on nearby cellular base stations. For example, the cellular radio communication component 106 may be configured to identify a cell from which the computing device 100 is receiving, or last received, signal from a cellular network. The cellular radio communication component 106 may also be configured to measure a round trip time (RTT) to a base station providing the signal, and combine this information with the identified cell to determine a location estimate. In another example, the cellular communication component 106 may be configured to use observed time difference of arrival (OTDOA) from three or more base stations to estimate the location of the computing device 100.

In some implementations, the computing device 100 may include a device platform (not shown), which may be configured as a multi-layered Linux platform. The device platform may include different applications and an application framework, as well as various kernels, libraries, and runtime entities. In other examples, other formats or operating systems may operate the computing device 100 as well.

The communication link 116 is illustrated as a wired connection; however, wireless connections may also be used. For example, the communication link 116 may be a wired serial bus such as a universal serial bus or a parallel bus, or a wireless connection using, e.g., short-range wireless radio technology, or communication protocols described in IEEE 802.11 (including any IEEE 802.11 revisions), among other possibilities.

The computing device 100 may include more or fewer components. Further, example methods described herein may be performed individually by components of the computing device 100, or in combination by one or all of the components of the computing device 100.

Figure 2:
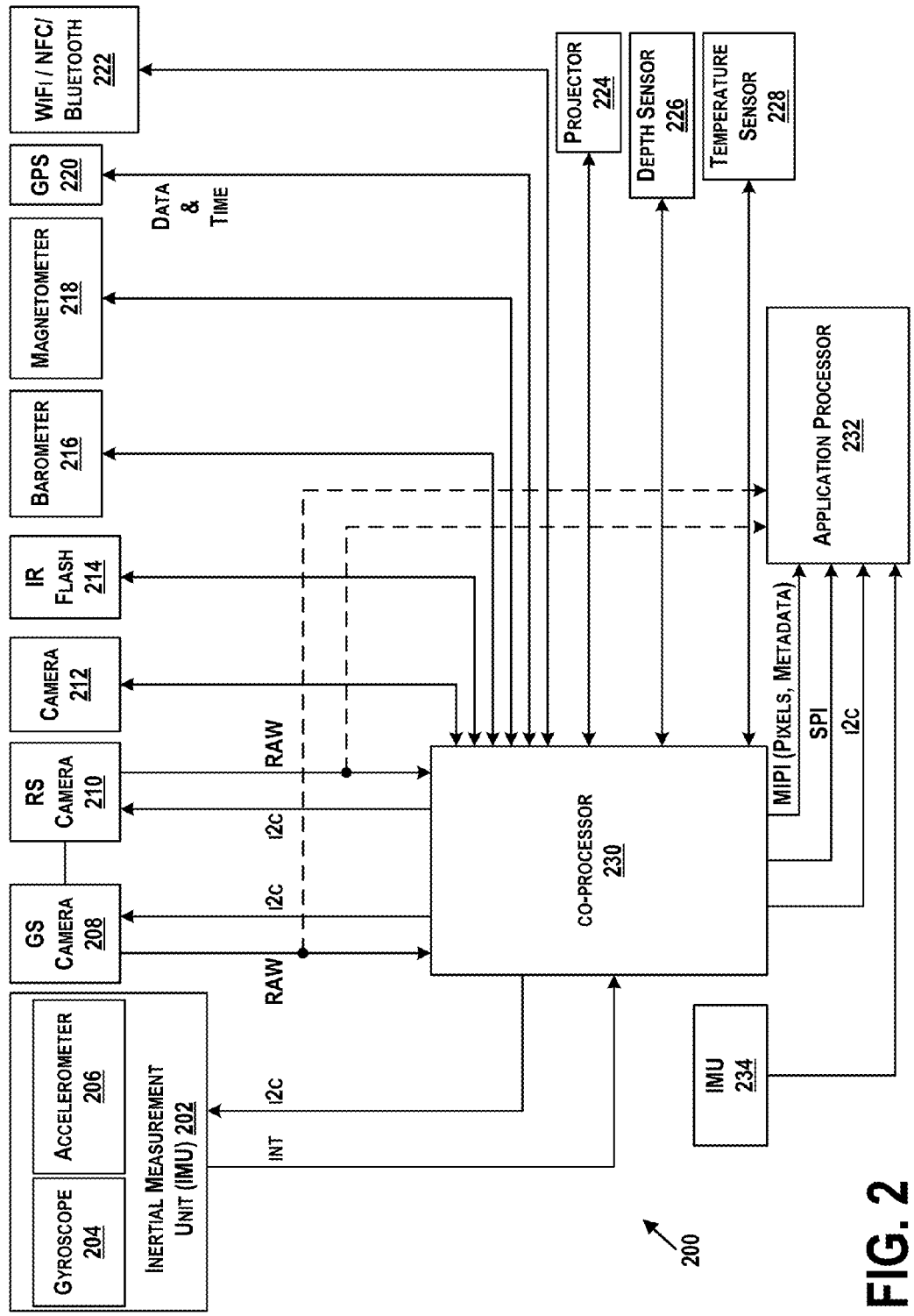
FIG. 2 illustrates another example computing device.

FIG. 2 illustrates another example computing device 200. The computing device 200 in FIG. 2 may be representative of a portion of the computing device 100 shown in FIG. 1. In FIG. 2, the computing device 200 is shown to include a number of sensors such as an inertial measurement unit (IMU) 202 including a gyroscope 204 and an accelerometer 206, a global shutter (GS) camera 208, a rolling shutter (RS) camera 210, a front facing camera 212, an infrared (IR) flash 214, a barometer 216, a magnetometer 218, a GPS receiver 220, a WiFi/NFC/Bluetooth sensor 222, a projector 224, a depth sensor 226, and a temperature sensor 228, each of which outputs to a co-processor 230. The co-processor 230 receives input from and outputs to an application processor 232. The computing device 200 may further include a second IMU 234 that outputs directly to the application processor 232.

The IMU 202 may be configured to determine a velocity, orientation, and gravitational forces of the computing device 200 based on outputs of the gyroscope 204 and the accelerometer 206.

The GS camera 208 may be configured on the computing device 200 to be a rear facing camera, so as to face away from a front of the computing device 200. The GS camera 208 may be configured to read outputs of all pixels of the camera 208 simultaneously. The GS camera 208 may be configured to have about a 120-170 degree field of view, such as a fish eye sensor, for wide-angle viewing.

The RS camera 210 may be configured to read outputs of pixels from a top of the pixel display to a bottom of the pixel display. As one example, the RS camera 210 may be a red/green/blue (RGB) infrared (IR) 4 megapixel image sensor, although other sensors are possible as well. The RS camera 210 may have a fast exposure so as to operate with a minimum readout time of about 5.5 ms, for example. Like the GS camera 208, the RS camera 210 may be a rear facing camera.

The camera 212 may be an additional camera in the computing device 200 that is configured as a front facing camera, or in a direction facing opposite of the GS camera 208 and the RS camera 210. The camera 212 may be configured to capture images of a first viewpoint of the computing device 200 and the GS camera 208 and the RS camera 210 may be configured to capture images of a second viewpoint of the device that is opposite the first viewpoint. The camera 212 may be a wide angle camera, and may have about a 120-170 degree field of view for wide angle viewing, for example.

The IR flash 214 may provide a light source for the computing device 200, and may be configured to output light in a direction toward a rear of the computing device 200 so as to provide light for the GS camera 208 and RS camera 210, for example. In some examples, the IR flash 214 may be configured to flash at a low duty cycle, such as 5 Hz, or in a non-continuous manner as directed by the co-processor 230 or application processor 232. The IR flash 214 may include an LED light source configured for use in mobile devices, for example.

Figures 3A, 3B:
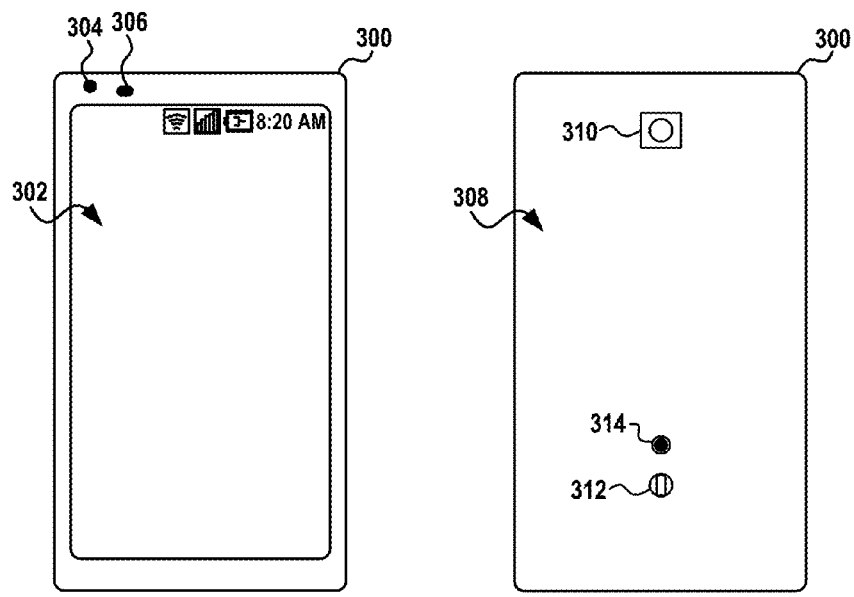
FIGS. 3A-3B are conceptual illustrations of an example computing device that show a configuration of some sensors of the computing device in FIG. 2.

FIGS. 3A-3B are conceptual illustrations of a computing device 300 that show a configuration of some sensors of the computing device 200 in FIG. 2. In FIGS. 3A-3B, the computing device 300 is shown as a mobile phone. The computing device 300 may be similar to either of computing device 100 in FIG. 1 or computing device 200 in FIG. 2. FIG. 3A illustrates a front of the computing device 300 in which a display 302 is provided, along with a front facing camera 304, and a P/L sensor opening 306 (e.g., a proximity or light sensor). The front facing camera 304 may be the camera 212 as described in FIG. 2.

FIG. 3B illustrates a back 308 of the computing device 300 in which a rear camera 310 and another rear camera 314 are provided. The rear camera 310 may be the RS camera 210 and the rear camera 312 may be the GS camera 208, as described in the computing device 200 in FIG. 2. The back 308 of the computing device 300 also includes an IR-flash 314, which may be the IR flash 214 or the projector 224 as described in the computing device 200 in FIG. 2. In one example, the IR flash 214 and the projector 224 may be one in the same. For instance, a single IR flash may be used to perform the functions of the IR flash 214 and the projector 224. In another example, the computing device 300 may include a second flash (e.g., an LED flash) located near the rear camera 310 (not shown). A configuration and placement of the sensors may be helpful to provide desired functionality of the computing device 300, for example, however other configurations are possible as well.

Referring back to FIG. 2, the barometer 216 may include a pressure sensor, and may be configured to determine air pressures and altitude changes.

The magnetometer 218 may be configured to provide roll, yaw, and pitch measurements of the computing device 200, and can be configured to operate as an internal compass, for example. In some examples, the magnetometer 218 may be a component of the IMU 202 (not shown).

The GPS receiver 220 may be similar to the GPS receiver 108 described in the computing device 100 of FIG. 1. In further examples, the GPS 220 may also output timing signals as received from GPS satellites or other network entities. Such timing signals may be used to synchronize collected data from sensors across multiple devices that include the same satellite timestamps.

The WiFi/NFC/Bluetooth sensor 222 may include wireless communication components configured to operate according to WiFi and Bluetooth standards, as discussed above with the computing device 100 of FIG. 1, and according to NFC standards to establish wireless communication with another device via contact or coming into close proximity with the other device.

The projector 224 may be or include a structured light projector that has a laser with a pattern generator to produce a dot pattern in an environment. The projector 224 may be configured to operate in conjunction with the RS camera 210 to recover information regarding depth of objects in the environment, such as three-dimensional (3D) characteristics of the objects. For example, the separate depth sensor 226 may be configured to capture video data of the dot pattern in 3D under ambient light conditions to sense a range of objects in the environment. The projector 224 and/or depth sensor 226 may be configured to determine shapes of objects based on the projected dot pattern. By way of example, the depth sensor 226 may be configured to cause the projector 224 to produce a dot pattern and cause the RS camera 210 to capture an image of the dot pattern. The depth sensor 226 may then process the image of the dot pattern, use various algorithms to triangulate and extract 3D data, and output a depth image to the co-processor 230.

The temperature sensor 228 may be configured to measure a temperature or temperature gradient, such as a change in temperature, for example, of an ambient environment of the computing device 200.

The co-processor 230 may be configured to control all sensors on the computing device 200. In examples, the co-processor 230 may control exposure times of any of cameras 208, 210, and 212 to match the IR flash 214, control the projector 224 pulse sync, duration, and intensity, and in general, control data capture or collection times of the sensors. The co-processor 230 may also be configured to process data from any of the sensors into an appropriate format for the application processor 232. In some examples, the co-processor 230 merges all data from any of the sensors that corresponds to a same timestamp or data collection time (or time period) into a single data structure to be provided to the application processor 232.

The application processor 232 may be configured to control other functionality of the computing device 200, such as to control the computing device 200 to operate according to an operating system or any number of software applications stored on the computing device 200. The application processor 232 may use the data collected by the sensors and received from the co-processor to perform any number of types of functionality. The application processor 232 may receive outputs of the co-processor 230, and in some examples, the application processor 232 may receive raw data outputs from other sensors as well, including the GS camera 208 and the RS camera 210.

The second IMU 234 may output collected data directly to the application processor 232, which may be received by the application processor 232 and used to trigger other sensors to begin collecting data. As an example, outputs of the second IMU 234 may be indicative of motion of the computing device 200, and when the computing device 200 is in motion, it may be desired to collect image data, GPS data, etc. Thus, the application processor 232 can trigger other sensors through communication signaling on common buses to collect data at the times at which the outputs of the IMU 234 indicate motion.

The computing device 200 shown in FIG. 2 may include a number of communication buses between each of the sensors and processors. For example, the co-processor 230 may communicate with each of the IMU 202, the GS camera 208, and the RS camera 212 over an inter-integrated circuit (I2C) bus that includes a multi-master serial single-ended bus for communication. The co-processor 230 may receive raw data collected, measured, or detected by each of the IMU 202, the GS camera 208, and the RS camera 212 over the same I2C bus or a separate communication bus. The co-processor 230 may communicate with the application processor 232 over a number of communication buses including a serial peripheral interface (SPI) bus that includes a synchronous serial data link that may operate in full duplex mode, the I2C bus, and a mobile industry processor interface (MIPI) that includes a serial interface configured for communicating camera or pixel information. Use of various buses may be determined based on need of speed of communication of data as well as bandwidth provided by the respective communication bus, for example.

Figure 4:
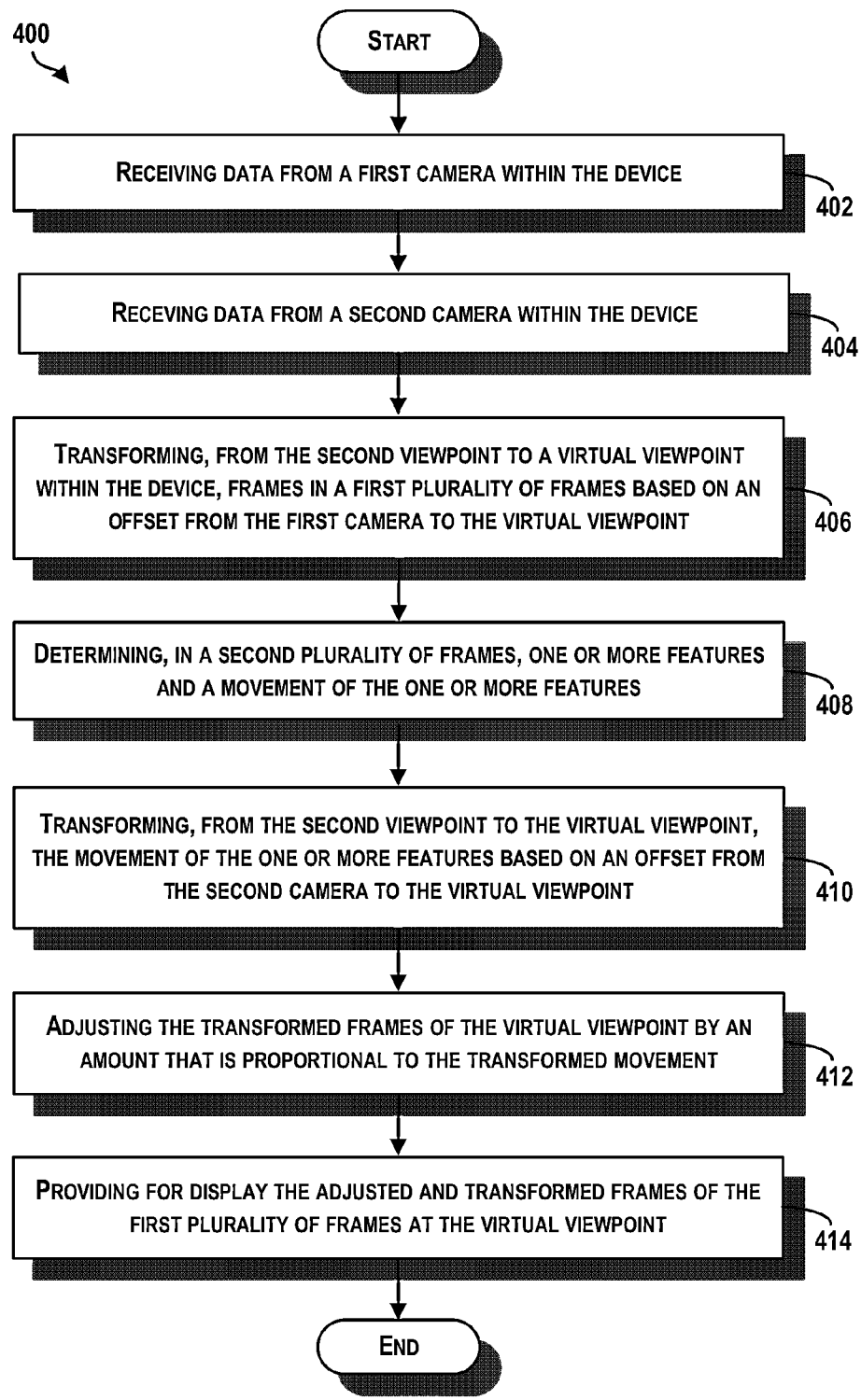
FIG. 4 is a block diagram of an example method for adjusting the viewpoint of sensors to a virtual viewpoint, in accordance with at least some embodiments described herein.

FIG. 4 is a block diagram of an example method for adjusting sensor data to a virtual viewpoint, in accordance with at least some embodiments described herein. Method 400 shown in FIG. 4 presents an embodiment of a method that, for example, could be used with the computing device 100 in FIG. 1, the computing device 200 in FIG. 2, or the computing device 300 in FIG. 3, for example, or may be performed by a combination of any components of the computing device 100 in FIG. 1, the computing device 200 in FIG. 2, or the computing device 300 in FIG. 3. Method 400 may include one or more operations, functions, or actions as illustrated by one or more of blocks 402-414. Although the blocks are illustrated in a sequential order, these blocks may in some instances be performed in parallel, and/or in a different order than those described herein. Also, the various blocks may be combined into fewer blocks, divided into additional blocks, and/or removed based upon the desired implementation.

In addition, for the method 400 and other processes and methods disclosed herein, the flowchart shows functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer readable medium, for example, such as a storage device including a disk or hard drive. The computer readable medium may include a non-transitory computer readable medium, for example, such as computer-readable media that stores data for short periods of time like register memory, processor cache and Random Access Memory (RAM). The computer readable medium may also include other non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, a tangible storage device, or other article of manufacture, for example. The program code (or data for the code) may also be stored or provided on other media including communication media, such as a wireless communication media, for example.

In addition, for the method 400 and other processes and methods disclosed herein, each block in FIG. 4 may represent circuitry that is wired to perform the specific logical functions in the process.

Functions of the method 400 may be fully performed by a computing device, or may be distributed across multiple computing devices and/or a server. In some examples, the computing device may receive information from sensors of the computing device, or where the computing device is a server the information can be received from another device that collects the information. The computing device could further communicate with a server to receive information from sensors of other devices, for example. The method 400 may further be performed by a device that has an application processor configured to function based on an operating system and a co-processor configured to receive data from a plurality of sensors of the device. The sensors may include any sensors as described above in any of FIG. 1, FIG. 2, or FIGS. 3A-3B, for example, including an IMU, a global shutter camera, a rolling shutter camera, a structured light projector, a depth camera, an infrared flash, a barometer, a magnetometer, and a temperature sensor.

At block 402, the method 400 includes receiving data from a first camera within a device. A processor, such as application processor 232 in FIG. 2, may receive the data from the first camera over a communication bus, such as an SPI, I2C, or MIPI bus. The data may transfer through a secondary processor, such as co-processor 230, en route to the processor. The secondary processor may be configured to synchronize the data with data from other sensors, such as an IMU or another camera. The first camera may send the data after capturing one or more frames.

The first camera may be arranged opposite a display of the device. For example, the first camera may be arranged as a rear-facing camera, such as GS camera 208 or RS camera 210 in FIG. 2, or rear cameras 310 or 314 in FIG. 3B. The first camera may also be arranged in different configurations that are not opposite the display. For example, the first camera may be orthogonal to the display. In such an arrangement, if the display is held in a position where the user looks down to view the display, the first camera may be aimed in a forward direction away from the user.

The data from the first camera may include a plurality of frames from a first viewpoint. Such a plurality may be referred to as a first plurality of frames. The first viewpoint may be from the point of view of a lens of the first camera. An image sensor of the first camera may capture frames in the plurality of frames from the point of view of the lens. The first camera may then send the frames to the processor.

The first camera may be configured to have a particular field-of-view. The particular field-of-view of the first camera may be a function of a various parameters of the first camera, such as the focal length of the lens. Further, the field-of-view of the first camera may be changed by adjusting the various parameters. For example, the lens may have an adjustable focal length, whereby adjusting the focal length of the lens adjusts the field-of-view of the first camera.

Ultimately, frames from the first camera may be provided to a display. Such frames may appear to present a view of an environment, such as the environment within the field-of-view of the first camera. In some examples, the device may be configured such that any delay between the first camera capturing the frames and providing the frames may be relatively short, such that the frames from the first camera may appear to present a live view of the environment when provided on the display.

At block 404, the method 400 includes receiving data from a second camera within the device. The processor may receive the data from the first camera over a communication bus, such as an SPI, I2C, or MIPI bus. The data may transfer through a secondary processor en route to the processor. Further, the second camera may send the data after capturing one or more frames.

The data from the second camera may include a plurality of frames from a second viewpoint. Such a plurality may be referred to as a second plurality of frames. The first viewpoint may be from the point of view of a lens of the second camera. An image sensor of the second camera may capture frames in the plurality of frames from the point of view of the lens. The first camera may then send the frames to the processor. The second camera may be arranged as a front-facing camera, such as front-facing camera 212 in FIG. 2, or front-facing camera 304 in FIG. 3B. In such an arrangement, frames from the second camera may show a portion of the user, so as to depict a relative position of the user to the second viewpoint.

At block 406, the method involves transforming, from the first viewpoint to a virtual viewpoint within the device, frames in the first plurality of frames based on an offset from the first camera to the virtual viewpoint. The virtual viewpoint may represent a reference point from which the view of the environment is provided. Further, the virtual viewpoint may be centered at a position within the device. For instance, the virtual viewpoint may centered at or near the center of the display. Alternatively, the virtual viewpoint may be centered at or near the center of the device.

The virtual viewpoint may be represented as a point within a three dimensional (3-d) coordinate system. For instance, the virtual viewpoint may be represented at the origin of the 3-d coordinate system. Alternatively, the virtual viewpoint may positioned at any other coordinates within the 3-d coordinate system. Sensors within the device may be represented within the 3-d coordinate system at various offsets from the virtual viewpoint. Further, within the 3-d coordinate system, sensors may be represented as particular points. For example, cameras may be modeled as pinhole cameras where each pinhole represents the position of a respective camera in the three-dimensional coordinate system.

As noted above, cameras within the device may be modeled as pinhole cameras. For example, the first camera may be modeled as a first pinhole camera. The first pinhole camera may be described by a particular camera matrix $C_a$. $C_a$ may describe a mapping of 3-d points within the field-of-view of the first camera to 2-d points (i.e. pixels) in frames taken by the first camera. The 3-d points within the field-of-view may be described as a projection $P_i$. Changing various parameters of the first camera, such as the field-of-view, may change the camera matrix $C_a$ accordingly.

The virtual viewpoint may be from the viewpoint of a virtual camera. The virtual camera may have various parameters, such as a field-of-view. The virtual camera may be modeled as a pinhole camera (i.e. a virtual pinhole camera). Further, the virtual pinhole camera may be described by a particular camera matrix $C_v$. When the virtual pinhole camera is represented at the origin of the 3-d coordinate system, $C_v$ may be, for example, $$\begin{bmatrix} 1 & 0 & 0 & 0 \\ 0 & f & 0 & 0 \\ 0 & 0 & 1 & 0 \end{bmatrix},$$

where f is the focal length of the virtual camera. The field-of-view of the virtual viewpoint may be configurable, such as by setting a parameter associated with the virtual camera. In some examples, the field-of-view of the virtual viewpoint may be configured to be narrower than the field-of-view of the first camera.

By extension, transforming, from the first viewpoint to a virtual viewpoint within the device, frames in the first plurality of frames may involve translating the projection $P_i$ from a point $^a p_i$ from the first viewpoint to a point $^v p_i$ from the virtual viewpoint: $^v p_i = C_v \cdot H_{av} \cdot C_a^{-2 \cdot a} p_i$, where the homography matrix $H_{av}$ is: $H_{av} = R - t n^T / d$, R is the rotation matrix by which the virtual camera is rotated in relation to the first camera, t is a translation vector from the virtual camera to the first camera representing the offset from the first camera to the virtual viewpoint, and $C_v$ and $C_a$ are the camera matrices. Through this transformation, frames of the first plurality of frames that were captured from the first viewpoint may appear as if they were captured from the virtual viewpoint. In some circumstances, this transformation may provide or enhance the effect of looking through a window into the environment. While the above matrix operations have been provided by way of example, one having skilled in the art will appreciate that additional or alternative operations may be involved in transforming frames in the first plurality of frames from the first viewpoint to a virtual viewpoint within the device.

At block 406, the method 400 includes determining, in the second plurality of frames, one or more features and a movement, relative to the second viewpoint, of the one or more features. The one or more features may be any features that may be recognized by object recognition algorithms presently known or later developed. Within examples, the one more features may be particular features that assist in determining the location of a user in relation to the device. For instance, the one or more features may be features of the user, such as a user's eyes. Alternatively, the one or more features may be one or more objects worn by the user, such as a pair of glasses.

Example movements will now be described relative to a 3-d coordinate system with an x, y, and z-axis in which the virtual viewpoint of the device is located at the origin looking down the z-axis and the second viewpoint is looking down the z-axis in the opposite direction and may be at an offset from the origin. One example movement may involve the device and the one or more features may moving relative to one another in the x-y plane, such as if the display were lifted upwards to point the device at a sign above a storefront. Alternatively, the device and the one or more features may move relative to one another in the z-axis, such as if the user, with the device in his or her hands, stretched out his or her arms to view the device from further away, or if the user brought the device closer to his or her face to get a closer look at the display. The movement may include a combination of a movement in the x-y plane and a movement along the z-axis.

The movement may also include one or more rotations. For instance, the device and the one or more features may rotate relative to one another about the x-axis, such as if the user rotated the device to point the device at the ground or at the sky. Alternatively, the device and the one or more features may rotate relative to one another about the y-axis or the z-axis. For example, in a 90° rotation about the z-axis, the user may switch from viewing the display as a landscape perspective to viewing the display as a portrait perspective. The movement may include a combination of rotations about the x, y, and z-axis. In some circumstances, the movement may include a combination of a movement in the x-y plane and along the z-axis as well.

To define a beginning and an end to the movement, in some examples, the movement may be defined movement of the device within a time interval or within a particular number of frames. For instance, the movement may be defined as a movement determined between one frame and a following frame. Or the movement may include a movement determined within a series of frames. Alternatively, the movement may be defined as a movement from one sample to a subsequent sample. Therefore, for example, if the user rotates the device 45° around the x-axis, the processor may, in some circumstances, determine two or more movements within the rotation.

Within examples, determining, in the second plurality of frames, a movement of the one or more features relative to the second viewpoint may involve determining a degree of change in size of one of the one or more features. For example, in one frame, the processor may determine that the user's eyes are at respective positions within the frame. The frame may be comprised of a plurality of pixels that are laid out in rows and columns, which may form a 2-d coordinate system. The positions may include a particular row and column (e.g. an (X, Y) set of coordinates in the 2-d coordinate system). In some circumstances, the eyes may be shown as multiple pixels and each position may include a number of rows and columns that represent different pixels. Alternatively, the positions may be an average row and average column of the multiple pixels.

The processor may determine the size of the one or more features. This may involve, for instance, determining a boundary around the each eye by recognizing the difference between the color of the eye and the surrounding skin. Each boundary may include a respective number of pixels, which may represent the size of the eyes. In following frames, the processor may determine that the size of the eyes is larger (i.e. that the determined boundary includes more pixels than in the preceding frames), which may occur if the user moves closer to the second camera. Conversely, when the user moves further from the second camera, the eyes may appear smaller (i.e. the determined boundary includes fewer pixels than in the preceding frames).

In some examples, the processor may determine a degree of change in size of the one or more features. For instance, in frames of the second plurality of frames, the processor may determine first boundaries around each eye of a user where each boundary includes a respective first number of pixels. In following frames, the processor may determine a second boundary around each eye that includes a respective second number of pixels. The processor may then determine a percentage difference between the first number of pixels and the second, which may represent the degree of change in size of the one or more features. Alternatively, in frames of the second plurality of frames, the processor may determine a first distance between a user's eyes. For example, one eye may be located at $(X_1, Y_1)$ within a frame while the other eye is located at $(X_2, Y_2)$ with the frame. In following frames, the processor may determine a second distance between the eyes and then may determine the percentage difference between the first distance and the second distance.

Determining, in the second plurality of frames, a movement of the one or more features relative to the second viewpoint may involve determining a direction of the movement of the one or more features. Further, the second viewpoint may define a plane orthogonal to the second viewpoint. For example, the second camera may have a lens that is pointed in a particular direction and the plane may be orthogonal to the particular direction that the lens is pointed. The processor may then determine a movement of the one or more features relative to the second viewpoint that is parallel to the plane. For instance, in one frame, the processor may determine that the user's eyes are at a first position within the frame. In following frames, the processor may determine that the user's eyes are at a second position within the frame. The processor may then determine the direction of the movement from the first position to the second position. The processor may also determine the magnitude of the movement.

The movement may change a viewing perspective from which the user views the display. For instance, if the device and the user's eyes are aligned such that the user looks horizontally to view the display, an upwards or downwards movement of the display may cause the user to adjust his eyes (such as to look up or down) to view the display after the upwards or downwards movement to the user. In such a circumstance, frames in the second plurality of frames may show the one or more features towards the top or towards the bottom of the frames. However, as one having skill in the art will appreciate, some movement of the device and the one or more features relative to one another may not be detected as movements. For instance, the user may combine an upwards movement of the device with a rotation about the x-axis. In some circumstances, such a movement may not result in the one or more features moving relative to the second viewpoint.

Movement may also be performed by other actors as well, in addition to a user holding the device, such as by a robotic arm moving the device, or even the device being present on a moving surface or platform. Thus, movement may be caused by or determined based on movement of the device with respect to an environment of the device, and movement of the device may be caused in any number of ways.

At block 410, the method 400 includes transforming, from the second viewpoint to the virtual viewpoint, the movement, relative to the second viewpoint, of the one or more features based on an offset from the second camera to the virtual viewpoint. For instance, the processor may translate a path, such as a vector, from the second viewpoint to the virtual viewpoint. The path may include, for example, two endpoints to define the path. The path may include, in some circumstances, one or more intermediate points which may assist in defining the path when the path is non-linear. Alternatively, the processor may transform the frames of the second plurality of frames from the second viewpoint to the virtual viewpoint. The processor may then determine the movement in the transformed frames.

At block 412, the method 400 includes adjusting the transformed frames of the virtual viewpoint by an amount that is proportional to the transformed movement. For instance, in some circumstances, the adjustment may be proportional and parallel to the movement. In other circumstances, such as with some rotations, the adjustment may be proportional and opposite of the movement.

For example, the movement may include a component along the z-axis, such that the device becomes relatively closer or further from the user after the movement. Within examples, adjusting the transformed frames of the virtual viewpoint may involve adjusting the field-of-view of the virtual viewpoint by an amount that is proportional to the determined degree of change in size of one of the one or more features. For instance, the movement of the device and the one or more features may involve the device getting 25% closer to the one or more features. In such a circumstance, the processor may adjust the transformed frames by scaling the field-of-view by 25%.

In some examples, adjusting the transformed frames of the virtual viewpoint may include selecting a subset of the plurality of pixels. For instance, the movement of the device relative to the one or more features may involve the device becoming 25% further from the one or more features. The processor may then select a subset that is proportional to a 25% increase in the field-of-view of the virtual viewpoint. Alternatively, each frame of the first plurality of frames comprises a plurality of pixels centered at a respective point, and the processor may select, in at least one transformed frames of the first plurality of frames, a subset of the plurality of pixels, wherein the subset is centered at a point that is different from the respective point by the amount that is proportional to the transformed movement. For instance, the movement of the device relative to the one or more features may involve the device become 10 cm further to the left of the one or more features. The processor may then select a subset that is proportional to the 10 cm movement to the left.

At block 414, the method 400 includes providing for display the adjusted and transformed frames of the first plurality of frames at the virtual viewpoint. For instance, the processor may provide the transformed frames to a display in a format that is suitable for the display. Alternatively, the processor may provide the frames to a graphics processing unit. The graphics processing unit may then provide the frames to the display.

In some examples, the method 400 may further include receiving data from an IMU within the device, wherein the data comprises a plurality of samples from a viewpoint of the IMU. As noted above, the IMU may contain one or more gyroscopes. The plurality of samples may include indications of changes in rotational attributes of the device, such as one or more changes in pitch, roll, and yaw (denoted $\theta_x$, $\theta_y$, and $\theta_z$) or a combination thereof. The IMU may also contain one or more accelerometers. For instance, the IMU may contain three accelerometers such that each accelerometer is arranged in an axis orthogonal to the other accelerometers so as to detect acceleration in three dimensions.

The method may then further include determining, in the plurality of samples, a movement of the device. For instance, the processor may determine, in the plurality of samples, a rotation of the device from a first orientation to a second orientation. Alternatively, the processor may determine, in the plurality of samples, a movement of the device from a first location in an environment to a second location in the environment, where the first location is different from the second location. For example, the user may bring the device closer to his or her face and the processor may determine that movement in the plurality of samples. Determining the movement may involve integrating the detected acceleration (such as directional, rotational, or a combination thereof) over time to determine a velocity of the movement (or a component thereof). Determining the movement may further involve integrating the determined velocity over time to determine the current position (such as a relative x', y', and z' coordinate) and/or orientation (e.g., a relative $\theta_x'$, $\theta_y'$, and $\theta_z'$). The current position may then be compared to previously determined positions to determine the movement.

The method may involve transforming the rotation of the device from the viewpoint of the IMU to the virtual viewpoint based on an offset from the IMU to the virtual viewpoint. For instance, the offset from the IMU to the virtual viewpoint may be considered a moment arm and the movement detected at the IMU may be transferred along the moment arm. Alternatively, the processor may transform the samples from the viewpoint of the IMU to the virtual viewpoint. The processor may then determine a movement of the device from the virtual viewpoint.

The method may then involve adjusting the frames of the virtual viewpoint by an amount that is proportional to the determined movement of the IMU. For instance, the processor may adjust the transformed frames of the virtual viewpoint by an amount that is proportional to the determined movement from the first location in the environment to the second location in the environment. Alternatively or additionally, the processor may adjust the transformed frames of the virtual viewpoint by a proportional and opposite rotation to the transformed rotation. For example, the movement may be a 30° counter-clockwise rotation about the y-axis. The frames may then be adjusted by rotating the virtual viewpoint 30° clockwise about the y-axis. In some circumstances, such a proportional and opposite rotation of the virtual viewpoint may enhance the effect of looking through a window into the environment. In some circumstances, when displayed, the adjusted frames may provide the effect of looking through the device to view a portion of the environment that is on a straight line from the user's eyes to the portion of the environment.

Adjusting the transformed frames of the virtual viewpoint by an amount that is proportional to the determined movement from the first location to the second location may involve determining that the movement, relative to the second viewpoint, of the one or more features occurred concurrently with the movement from the first location in the environment to the second location in the environment. For instance, the frames that show the movement may be associated with a time stamp. The processor may determine from the time stamps, the beginning and ending time of the movement. The processor may then determine whether the movements occurred concurrently by comparing the beginning and ending times of the movements.

Adjusting the transformed frames of the virtual viewpoint by an amount that is proportional to the determined movement from the first location to the second location may further involve determining that the movement, relative to the second viewpoint, of the one or more features is different from the movement from the first location in the environment to the second location in the environment. The processor may then adjust the movement, relative to the second viewpoint, of the one or more features based on the movement from the first location in the environment to the second location in the environment. For instance, the processor may average the two movements.

In some examples, the method 400 may further involve receiving data from a third camera within the device, wherein the data comprises a third plurality of frames from a third viewpoint. The third camera may, for example, be arranged as a rear-facing camera, such as GS camera 208 or RS camera 210 in FIG. 2, or rear cameras 310 or 314 in FIG. 3B. The method may then include transforming frames in the third plurality of frames from the third viewpoint to the virtual viewpoint based on an offset from the third camera to the virtual viewpoint. The method may also include adjusting the transformed frames in the third plurality of frames by the amount that is proportional to the transformed movement. The method may then include providing for display the adjusted and transformed frames of the third plurality of frames at the virtual viewpoint.

FIG. 5A shows a front-view of an example device 500 that may perform one or more of the functions described herein. The device may include a processor 502, a data storage 504, a rear-facing camera 506, and an IMU 508 (not shown). The device may also include a front-facing camera 510 and a display 512. As shown in FIG. 5A, the device 500 is held by a user 514 (of whom the hands are shown) and is directed at an environment 516 that includes a house and a tree, as shown. The processor 502 may receive data that includes a first plurality of frames from the rear-facing camera 506. Frames in the first plurality of frames may depict a portion of the environment 516 from the viewpoint of the rear-facing camera 506, as shown. The processor 502 may transform frames of the first plurality of frames from a viewpoint of the rear-facing camera 506 to a virtual viewpoint based on an offset from the rear-facing camera 506 to the virtual viewpoint. In this example, the virtual viewpoint is centered at the center of the display 512. The processor 502 may then provide the transformed frames to the display 512 for display. The example functions described above may provide, to the user 514 looking at the display 512, the effect of looking through a window at the environment 516 by showing a portion of the environment on the display 512, as shown.

Figure 5B:
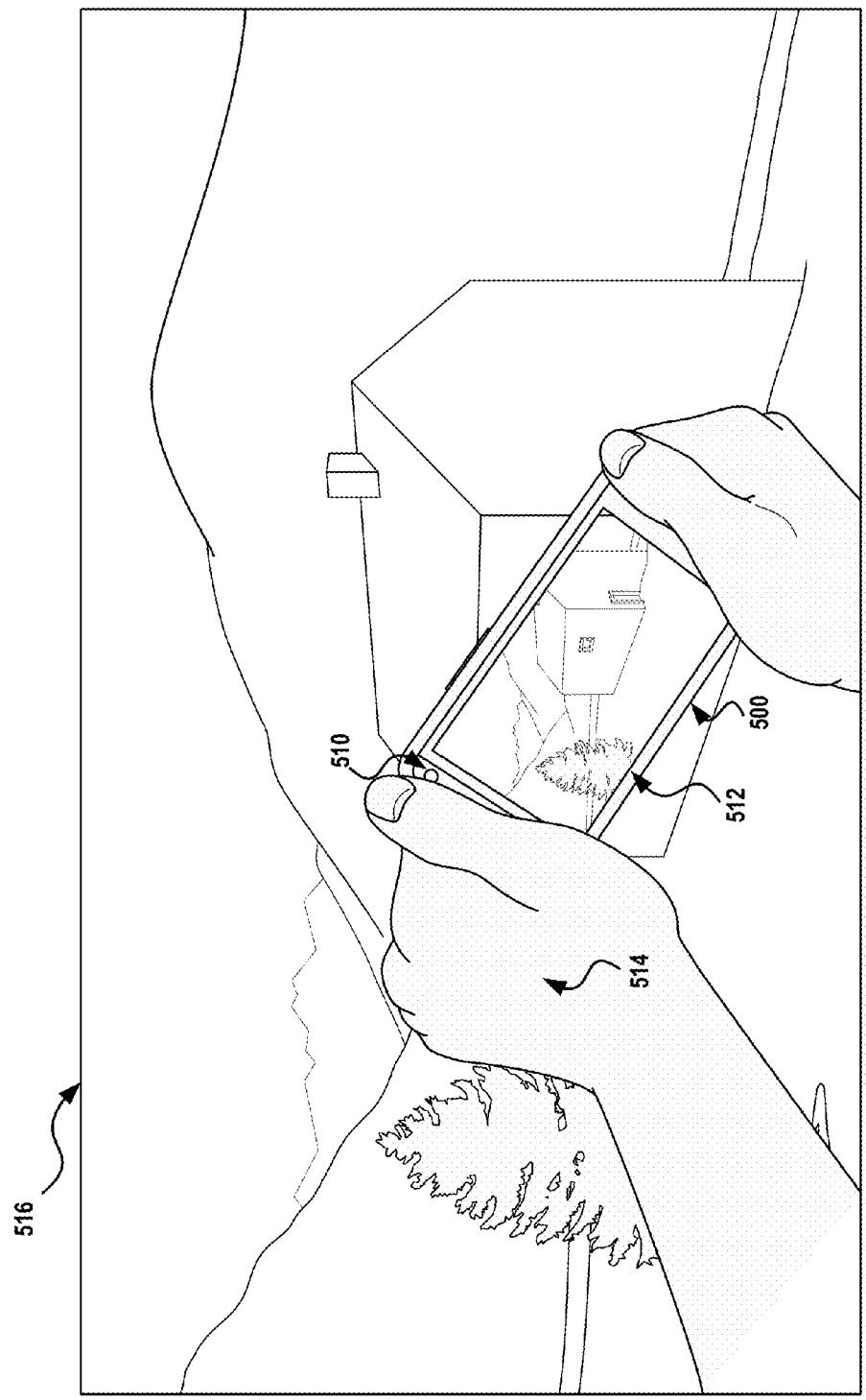
FIG. 5B is another illustration of the example device that may carry out one or more of the functions described herein operating in the example environment.

FIG. 5B shows a front-view of the example device 500 after undergoing a movement. Specifically, as compared with FIG. 5A, the device 500 has been rotated clockwise about the z-axis by approximately 30° (given that the coordinate system is defined such that the virtual viewpoint is looking down the z-axis). While a rotation about the z-axis has been shown by way of example, the movement may include a movement in any of the six degrees of freedom, or any combination thereof.

To enhance the effect of looking through the window at the environment 516 while the example device 500 undergoes the movement, the processor 502 may perform functions. For instance, the processor 502 may receive, from the front-facing camera 510, data that includes a second plurality of frames. The second plurality of frames may depict features of the user 514. The processor 502 may then determine, in the second plurality of frames, one or more features of the user 514, such as a left eye and a right eye. In some example arrangements, the front-facing camera 510 may be positioned at an offset from the virtual viewpoint. In such an arrangement, the processor 502 may transform, from the second viewpoint to the virtual viewpoint, the movement, relative to the second viewpoint, of the one or more features based on the offset from the front-facing camera 510 to the virtual viewpoint. The processor may further determine the movement of the one or more features relative to the second viewpoint. One having skill in the art will appreciate that while the processor may determine a movement of the one or more features relative to the second viewpoint, the processor may likewise determine a movement of the device (and the second viewpoint) relative to the one or more features because the movement is relative. The processor 502 may then adjust the frames of the first plurality of the virtual viewpoint by an amount that is proportional to the determined movement (i.e. a 30° rotation counter-clockwise about the z-axis).

The processor 502 may provide the adjusted frames to the display 512. As shown in FIG. 5B, functions described herein may enhance the effect of looking through a window at the environment 516. Particularly, as the device 500 is rotated, the portion of the environment 516 shown on the display 510 stays aligned with environment 512, as shown.

FIG. 5C shows a front-view of the example device 500 after undergoing a second movement. Specifically, as compared with FIG. 5A, the device 500 has been rotated counter-clockwise about the y-axis by approximately 45° (given that the coordinate system is defined such that the virtual viewpoint is looking down the z-axis). To enhance the effect of looking through the window at the environment 512 while the example device 500 undergoes the movement, the processor 502 may adjust the frames in the first plurality to reflect the virtual viewpoint.

For instance, the processor 502 may receive data from the IMU 508, wherein the data comprises a plurality of samples from a viewpoint of the IMU 508. The processor 502 may then determine, in the plurality of samples, the 45° counter-clockwise rotation about the y-axis. If the IMU 508 is positioned at an offset from the virtual viewpoint, the processor 502 may also transform the rotation of the device from the viewpoint of the IMU to the virtual viewpoint based on the offset. The processor 502 may then display the transformed frames on the display 512, as shown. As shown in FIG. 5C, as the device 500 is rotated, the portion of the environment 516 shown on the display 510 stays aligned with the user 514 and with the virtual viewpoint in the center of the display. If the user 514 were to move to the right to become aligned with the display 512, the processor 502 may then adjust the frames again according to that movement. For instance, the adjusted frames may show the tree and the environment to the left of the house.

Figure 6A:
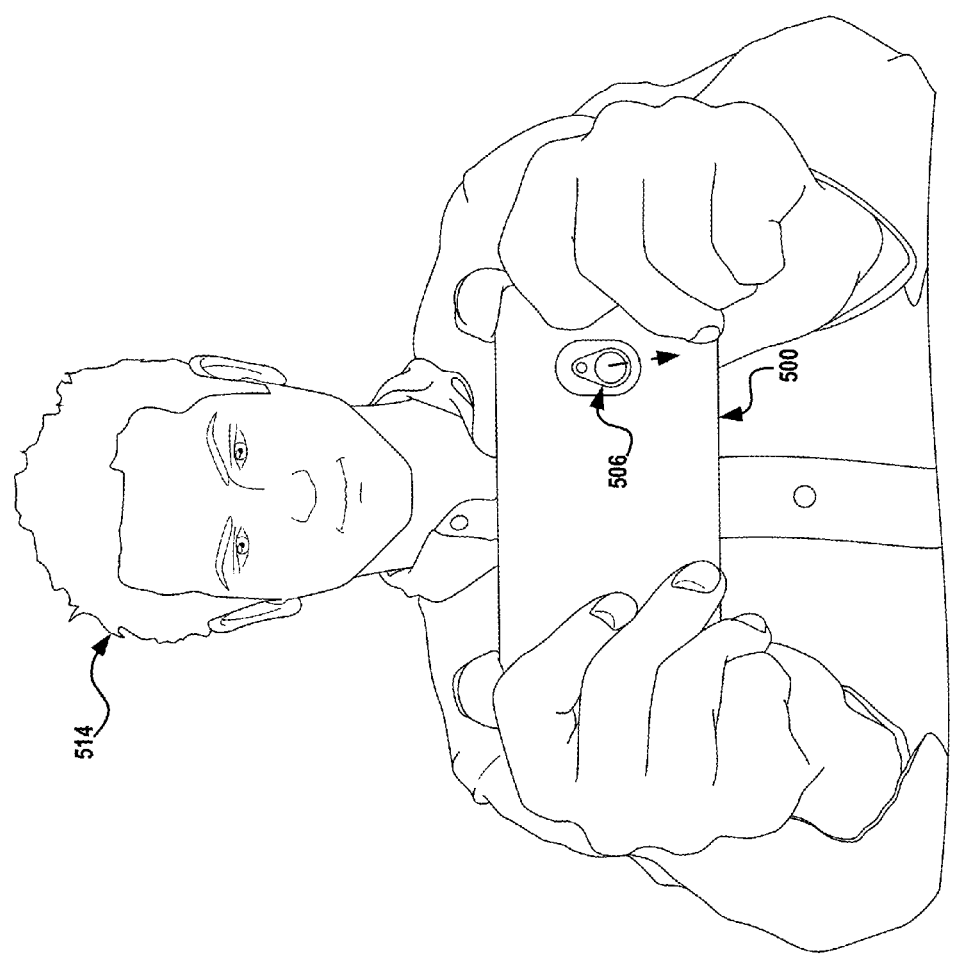
FIG. 6A is an illustration of the example device that may carry out one or more of the functions described herein being held by a user.

FIG. 6A shows a rear-view of the example device 500. In FIG. 6A, the rear-facing camera 506 is shown. The user 514 is shown holding the device 500 and looking at the display 512. The processor 502, the data storage 504, the IMU 508, the front-facing camera 510 and the display 512 are not shown.

Figure 6B:
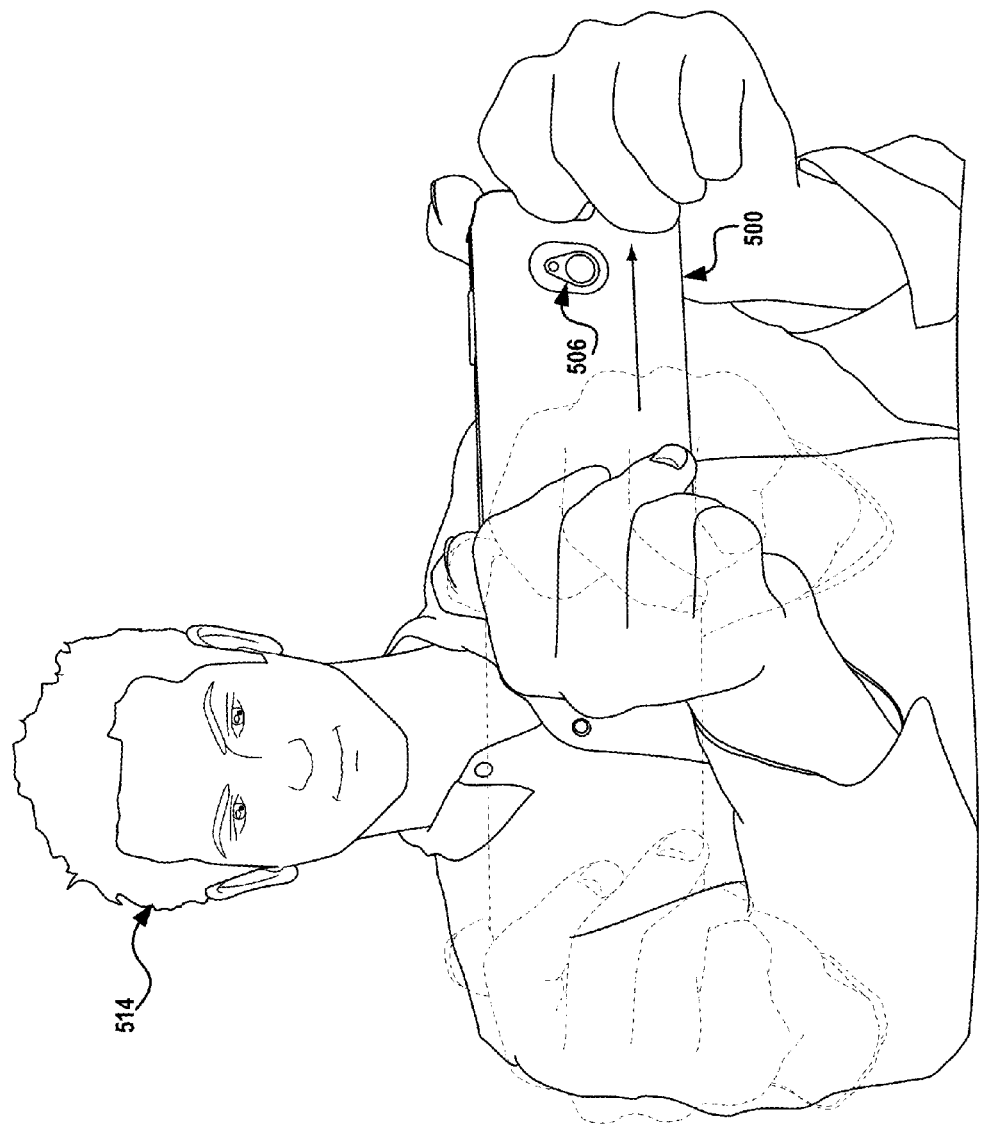
FIG. 6B is another illustration of the example device that may carry out one or more of the functions described herein being held by the user.

FIG. 6B shows a rear-view of the example device 500 after the device 500 undergoes a movement. Specifically, as compared with FIG. 6A, the device 500 has been moved to the user's left by approximately 15 cm. After the movement, the device 500 is still pointed straight ahead out of the page. To compensate for such a movement, the user 514 may change the direction that he or she views the display by directing his or her eyes leftward at the display 512, as shown.

The processor may adjust frames in response to such a movement. For instance, the processor 502 may receive frames from the rear-facing camera 506 and the front-facing camera 510. The processor 502 may detect the movement in frames from the front-facing camera 510 and determine that the movement was 15 cm to the left.

The processor 502 may then adjust frames from the front-facing camera an amount proportional to the 15 cm movement to the left. After the adjustment, the frames from the front-facing camera 510 may depict a portion of the environment that is aligned with the virtual viewpoint and the user. The processor 502 may then display the frames on the display 512.

Figure 6C:
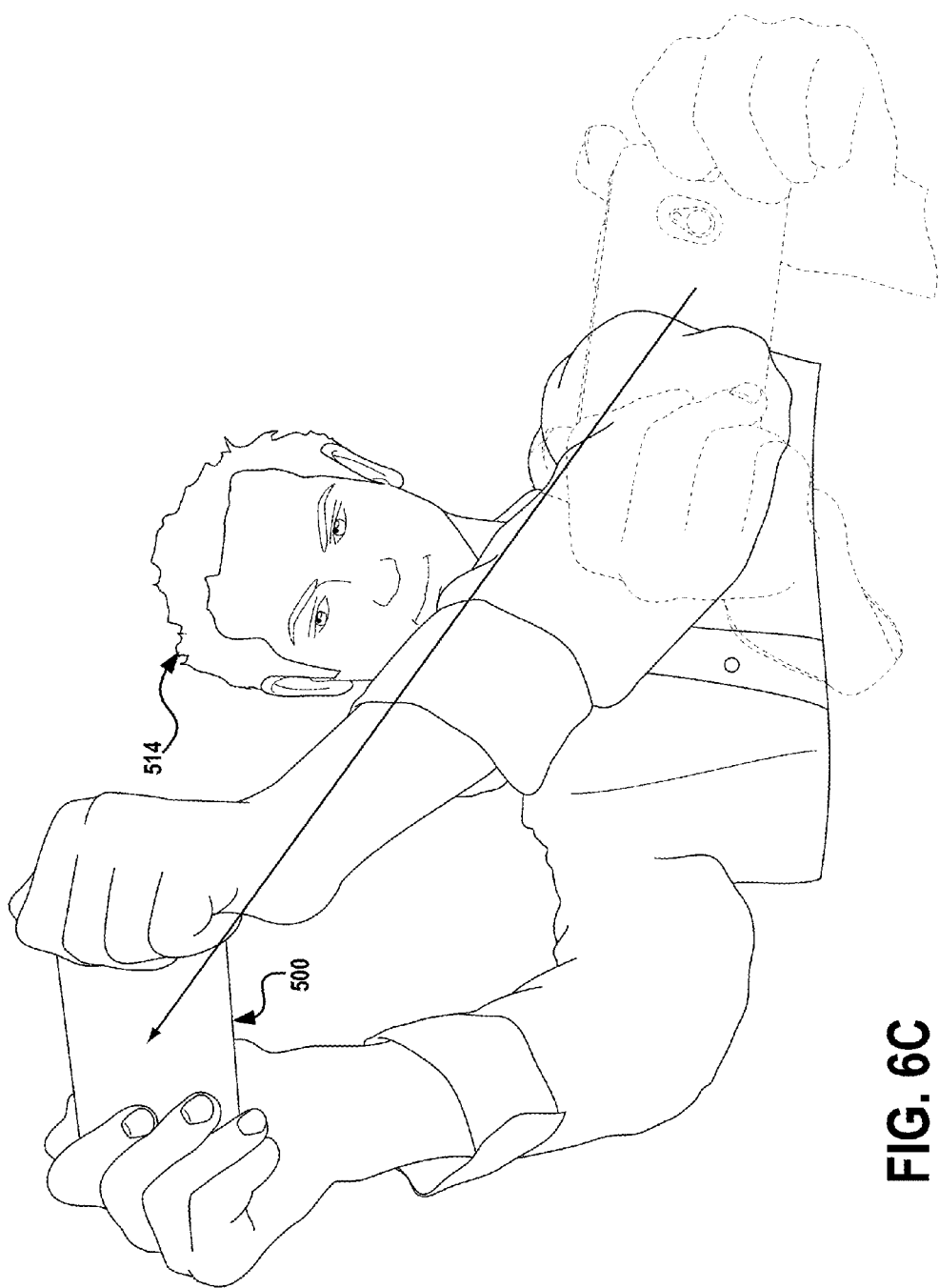
FIG. 6C is another illustration of the example device that may carry out one or more of the functions described herein being held by the user.

FIG. 6C shows a rear-view of the example device 500 after undergoing a movement. Specifically, as compared with FIG. 6B, the device 500 has been moved upwards and to the right relative to the user 514 by approximately 30 cm. In addition, the device 500 has been rotated about the y-axis by approximately 5°. The processor 502 may adjust frames in response to such a movement that include rotational and directional components. After the adjustment, the frames from the front-facing camera 510 may depict a portion of the environment that is aligned with the virtual viewpoint and the user.

It should be understood that arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location, or other structural elements described as independent structures may be combined.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims, along with the full scope of equivalents to which such claims are entitled. It is also to be understood that the terminology used herein is for the purpose of describing particular embodiments only, and is not intended to be limiting.

What is claimed is:

1. A method comprising:
   receiving data from a first camera within a device, wherein the data comprises a first plurality of frames from a first viewpoint;
   receiving data from a second camera within the device, wherein the data comprises a second plurality of frames from a second viewpoint, and wherein the second viewpoint is opposite the first viewpoint;
   transforming, from the first viewpoint to a virtual viewpoint within the device, frames in the first plurality of frames based on an offset from the first camera to the virtual viewpoint;
   determining, in the second plurality of frames, one or more features and a movement relative to the second viewpoint of the one or more features;

transforming, from the second viewpoint to the virtual viewpoint, the movement relative to the second viewpoint of the one or more features based on an offset from the second camera to the virtual viewpoint;

adjusting, by one or more processors, the transformed frames of the virtual viewpoint by an amount that is proportional to the transformed movement; and providing for display the adjusted and transformed frames of the first plurality of frames at the virtual viewpoint.

2. The method of claim 1, wherein the second viewpoint defines a plane that is orthogonal to the second viewpoint, and wherein determining, in the second plurality of frames, a movement of the one or more features relative to the second viewpoint comprises:

determining a direction of the movement of the one or more features that is parallel to the plane.

3. The method of claim 1, wherein determining, in the second plurality of frames, the movement of the one or more features relative to the second viewpoint comprises:

determining a degree of change in size of one of the one or more features.

4. The method of claim 3, wherein the virtual viewpoint has a field-of-view, and wherein adjusting the transformed frames of the virtual viewpoint comprises:

adjusting the field-of-view by an amount that is proportional to the determined degree of change in size of one of the one or more features.

5. The method of claim 1, further comprising:

receiving data from an inertial measurement unit (IMU) within the device, wherein the data comprises a plurality of samples from a viewpoint of the IMU;

determining, in the plurality of samples, a rotation of the device from a first orientation to a second orientation;

transforming the rotation of the device from the viewpoint of the IMU to the virtual viewpoint based on an offset from the IMU to the virtual viewpoint; and adjusting the transformed frames of the virtual viewpoint by a proportional and opposite rotation to the transformed rotation.

6. The method of claim 1, further comprising:

receiving data from an inertial measurement unit within the device, wherein the data comprises a plurality of samples;

determining, in the plurality of samples, a movement of the device from a first location in an environment to a second location in the environment, wherein the first location is different from the second location; and adjusting the transformed frames of the virtual viewpoint by an amount that is proportional to the determined movement from the first location in the environment to the second location in the environment.

7. The method of claim 6, wherein adjusting the transformed frames of the virtual viewpoint by an amount that is proportional to the determined movement from the first location to the second location comprises:

determining that the movement, relative to the second viewpoint, of the one or more features occurred concurrently with the movement from the first location in the environment to the second location in the environment;

determining that the movement, relative to the second viewpoint, of the one or more features is different from the movement from the first location in the environment to the second location in the environment; and adjusting the movement, relative to the second viewpoint, of the one or more features based on the movement from the first location in the environment to the second location in the environment.

8. The method of claim 1, further comprising:

receiving data from a third camera within the device, wherein the data comprises a third plurality of frames from a third viewpoint;

transforming frames in the third plurality of frames from the third viewpoint to the virtual viewpoint based on an offset from the third camera to the virtual viewpoint; and adjusting the transformed frames in the third plurality of frames by the amount that is proportional to the transformed movement; and providing for display the adjusted and transformed frames of the third plurality of frames at the virtual viewpoint.

9. A device comprising:

a first camera;

a second camera;

one or more processors; and data storage configured to store instructions, that when executed by the one or more processors, cause the device to:

receive data from the first camera, wherein the data comprises a first plurality of frames from a first viewpoint;

receive data from the second camera, wherein the data comprises a second plurality of frames from a second viewpoint, and wherein the second viewpoint is different from the first viewpoint;

transform, from the first viewpoint to a virtual viewpoint within the device, frames in the first plurality of frames based on an offset from the first camera to the virtual viewpoint;

determine, in the second plurality of frames, one or more features and a movement relative to the second viewpoint of the one or more features;

transform, from the second viewpoint to the virtual viewpoint the movement, relative to the second viewpoint of the one or more features based on an offset from the second camera to the virtual viewpoint;

adjust the transformed frames of the virtual viewpoint by an amount that is proportional to the transformed movement; and provide for display the adjusted and transformed frames of the first plurality of frames at the virtual viewpoint.

10. The device of claim 9, wherein the second viewpoint defines a plane that is orthogonal to the second viewpoint, and wherein determining, in the second plurality of frames, a movement of the one or more features relative to the second viewpoint comprises:

determining a direction of the movement of the one or more features that is parallel to the plane.

11. The device of claim 9, wherein determining, in the second plurality of frames, the movement of the one or more features relative to the second viewpoint comprises:

determining a degree of change in size of one of the one or more features.

12. The device of claim 11, wherein the virtual viewpoint has a field-of-view, and wherein adjusting the transformed frames of the virtual viewpoint comprises:

adjusting the field-of-view by an amount that is proportional to the determined degree of change in size of one of the one or more features.

13. The device of claim 9, wherein the instructions further cause the device to:

receive data from an inertial measurement unit (IMU) within the device, wherein the data comprises a plurality of samples from a viewpoint of the IMU;

determine, in the plurality of samples, a rotation of the device from a first orientation to a second orientation;

transform the rotation of the device from the viewpoint of the IMU to the virtual viewpoint based on an offset from the IMU to the virtual viewpoint; and adjust the transformed frames of the virtual viewpoint by a proportional and opposite rotation to the transformed rotation.

14. The device of claim 9, wherein the virtual viewpoint has a first field-of-view, and wherein the first viewpoint has a second field-of-view that is wider than the first field-of-view.

15. The device of claim 14, wherein each frame of the first plurality of frames comprises a plurality of pixels centered at a respective point, and wherein adjusting the transformed frames of the virtual viewpoint comprises:

selecting, in at least one transformed frames of the first plurality of frames, a subset of the plurality of pixels, wherein the subset is centered at a point that is different from the respective point by the amount that is proportional to the transformed movement.

16. A non-transitory computer readable medium having stored therein instructions, that when executed by a device, cause the device to perform operations, the operations comprising:

receiving data from a first camera within the device, wherein the data comprises a first plurality of frames from a first viewpoint;

receiving data from a second camera within the device, wherein the data comprises a second plurality of frames from a second viewpoint, and wherein the second viewpoint is opposite the first viewpoint;

determining, in the second plurality of frames, one or more features and a movement relative to the second viewpoint of the one or more features;

transforming, from the first viewpoint to a virtual viewpoint within the device, frames in the first plurality of frames based on an offset from the first camera to the virtual viewpoint;

transforming, from the second viewpoint to the virtual viewpoint, the movement relative to the second viewpoint of the one or more features based on an offset from the second camera to the virtual viewpoint;

adjusting the frames of the virtual viewpoint by an amount that is proportional to the transformed movement; and providing for display the adjusted frames of the first plurality of frames at the virtual viewpoint.

17. The non-transitory computer readable medium of claim 16, the operations further comprising:

receiving data from an inertial measurement unit (IMU) within the device, wherein the data comprises a plurality of samples from a viewpoint of the IMU;

determining, in the plurality of samples, a rotation of the device from a first orientation to a second orientation;

transforming the rotation of the device from the viewpoint of the IMU to the virtual viewpoint based on an offset from the IMU to the virtual viewpoint; and adjusting the frames of the virtual viewpoint by a proportional and opposite rotation to the transformed rotation.

18. The non-transitory computer readable medium of claim 16, the operations further comprising:

receiving data from an inertial measurement unit (IMU) within the device, wherein the data comprises a plurality of samples;

determining, in the plurality of samples, a movement of the device from a first location in an environment to a second location in the environment, wherein the first location is different from the second location;

transforming the movement of the device from a first location in an environment to a second location in the environment based on an offset from the IMU to the virtual viewpoint; and adjusting the frames of the virtual viewpoint by an amount that is proportional to the transformed movement from the first location in the environment to the second location in the environment.

19. The non-transitory computer readable medium of claim 18, wherein adjusting the transformed frames of the virtual viewpoint by an amount that is proportional to the determined movement from the first location to the second location comprises:

determining that the movement, relative to the second viewpoint, of the one or more features occurred concurrently with the movement from the first location in the environment to the second location in the environment;

determining that the transformed movement, relative to the second viewpoint, of the one or more features is different from the movement from the first location in the environment to the second location in the environment; and adjusting the movement, relative to the second viewpoint, of the one or more features based on the transformed movement from the first location in the environment to the second location in the environment.

20. The non-transitory computer readable medium of claim 18, the operations further comprising:

receiving data from a third camera within the device, wherein the data comprises a third plurality of frames from a third viewpoint;

transforming frames in the third plurality of frames from the third viewpoint to the virtual viewpoint based on an offset from the third camera to the virtual viewpoint;

adjusting the transformed frames in the third plurality of frames by the amount that is proportional to the transformed movement; and providing for display the adjusted and transformed frames of the third plurality of frames at the virtual viewpoint.

* * * * *